US010872477B2

(12) United States Patent
Knorr et al.

(10) Patent No.: US 10,872,477 B2
(45) Date of Patent: Dec. 22, 2020

(54) METHOD AND DEVICE FOR UPLOADING DATA OF A MOTOR VEHICLE

(71) Applicant: Robert Bosch GmbH, Stuttgart (DE)

(72) Inventors: Moritz Michael Knorr, Hildesheim (DE); Alexander Geraldy, Hildesheim (DE); Christian Skupin, Garbsen (DE); Daniel Zaum, Sarstedt (DE); Emre Cakar, Hannover (DE); Hanno Homann, Hannover (DE); Holger Mielenz, Ostfildern (DE); Isabella Hinterleitner, Graz (AT); Jochen Marx, Emmerke (DE); Lukas Klejnowski, Burgdorf (DE); Markus Langenberg, Hannover (DE); Michael Pagel, Bad Liebenzell (DE)

(73) Assignee: Robert Bosch GmbH, Stuttgart (DE)

( * ) Notice: Subject to any disclaimer, the term of this patent is extended or adjusted under 35 U.S.C. 154(b) by 335 days.

(21) Appl. No.: 15/736,141

(22) PCT Filed: May 13, 2016

(86) PCT No.: PCT/EP2016/060825
§ 371 (c)(1),
(2) Date: Dec. 13, 2017

(87) PCT Pub. No.: WO2017/001104
PCT Pub. Date: Jan. 5, 2017

(65) Prior Publication Data
US 2018/0357839 A1 Dec. 13, 2018

(30) Foreign Application Priority Data
Jun. 30, 2015 (DE) .................. 10 2015 212 128

(51) Int. Cl.
*G07C 5/00* (2006.01)
*G01C 21/32* (2006.01)
(Continued)

(52) U.S. Cl.
CPC ............. *G07C 5/008* (2013.01); *G01C 21/32* (2013.01); *G01C 21/3602* (2013.01); *G06F 16/29* (2019.01); *H04W 4/40* (2018.02)

(58) Field of Classification Search
CPC .......... G07C 5/008; H04W 4/40; G06F 16/29; G01C 21/32; G01C 21/3602
See application file for complete search history.

(56) References Cited

U.S. PATENT DOCUMENTS 8,370,392 B1* 2/2013 Hunt ...................... H04Q 9/00
707/791
9,746,352 B2* 8/2017 Petroski ................. H04B 13/02
(Continued)

FOREIGN PATENT DOCUMENTS

EP 0921509 A2 6/1999
JP H11249552 A 9/1999
WO 2009039818 A2 4/2009

OTHER PUBLICATIONS

International Search Report dated Aug. 5, 2016, of the corresponding International Application PCT/EP2016/060825 filed May 13, 2016.

*Primary Examiner* — Anne Marie Antonucci
*Assistant Examiner* — Sahar Motazedi
(74) *Attorney, Agent, or Firm* — Norton Rose Fulbright US LLP; Gerard Messina

(57) ABSTRACT

A method for uploading data of a motor vehicle, including the steps: acquiring surrounding-area data of the motor vehicle with the aid of a sensor device; generating a locational reference for the acquired surrounding-area data; evaluating the acquired surrounding-area data by comparing (Continued)

the acquired surrounding-area data to known surrounding-area data of a data storage unit of a server device; and uploading the acquired surrounding-area data to the server device (40) as a function of the evaluation.

8 Claims, 2 Drawing Sheets

(51) Int. Cl.
*G01C 21/36* (2006.01)
*H04W 4/40* (2018.01)
*G06F 16/29* (2019.01)

(56) References Cited

U.S. PATENT DOCUMENTS

2001/0019309 A1    9/2001  Saeki et al.
2005/0149259 A1*   7/2005  Cherveny .............. G01C 21/26
                                                         701/532

\* cited by examiner

METHOD AND DEVICE FOR UPLOADING DATA OF A MOTOR VEHICLE

FIELD

The present invention relates to a method for uploading data of a motor vehicle. The present invention further relates to a device for uploading data of a motor vehicle.

BACKGROUND INFORMATION

Methods for providing data that is as up-to-date as possible are available in navigation technology. In this context, a data service provider may acquire data, aggregate the acquired data, and provide an updated version of the aggregated data to users at specific time intervals (for example, quarterly or yearly).

So-called autonomous data aggregation is available, which is carried out on the same device on which data to be aggregated is acquired. The data aggregated on the device is subsequently usable exclusively for application on this device.

So-called collective data aggregation, which provides for aggregation of data by a central entity, typically, a server or a server network. Users of the data service and/or a special group of data acquirers carry out data acquisition. The acquired data is subsequently transmitted to the server for the purpose of aggregation.

The concept last mentioned provides the highest level of currentness of aggregated data, in that the collective data is acquired and provided to the server for aggregation, and in each instance, the current version of the centrally aggregated data is made available to the data purchaser by the server.

SUMMARY

An object of the present invention is to provide an improved method for uploading data of a motor vehicle.

According to one aspect of the present invention, the object may be achieved by a method for uploading data of a motor vehicle, including the steps:
  acquiring surrounding-area data of the motor vehicle with the aid of a sensor device;
  generating a locational reference for the acquired surrounding-area data;
  evaluating the acquired surrounding-area data by comparing the acquired surrounding-area data to known surrounding-area data of a data storage unit of a server device; and
  uploading the acquired surrounding-area data to the server device as a function of the evaluation.

According to a second aspect, the object may be achieved by a device for uploading data of a motor vehicle, including:
  a verification device and a relevance rating device to evaluate acquired surrounding-area data by comparing the acquired surrounding-area data to known surrounding-area data of a server device; and
  a second intermediate data storage unit for temporarily storing the acquired surrounding-area data, the acquired surrounding-area data being uploadable from the second intermediate data storage unit to the server device as a function of the evaluation of the surrounding-area data.

In this manner, uploading of acquired surrounding-area data of the motor vehicle to the server device may be optimized as a function of an available communications band width. In this context, it is preferable that, primarily, data having a high priority factor is uploaded. In an advantageous manner, this is particularly applicable to a highly automated or autonomously operable motor vehicle.

Advantageous further refinements of the method and the device are described herein.

One advantageous further refinement of the method provides that each data object of the acquired surrounding-area data be assigned a degree of currentness, where the more dissimilar the data object is to a corresponding, known data object, the higher the degree of currentness is.

One advantageous further refinement of the method provides that each data object of the acquired surrounding-area data be assigned a first priority factor, where the higher the degree of currentness is, the higher the first priority factor is.

One further advantageous refinement of the method distinguishes itself in that each data object of the acquired surrounding-area data is assigned a specific degree of relevance, where the higher a relevance of the data object is, the higher the degree of relevance is.

One advantageous further refinement of the method provides that each data object of the acquired surrounding-area data be assigned a second priority factor, where the higher the degree of relevance of the data object is, the higher the second priority factor is.

One advantageous further refinement of the method provides that an overall priority be ascertained from the first priority factor and the second priority factor.

One further advantageous refinement of the method provides that the uploading of the acquired surrounding-area data to the server device be carried out as a function of the overall priority factor. In this manner, a two-stage prioritization procedure is carried out for each data object; as a result of this, the surrounding-area data is uploaded to the server device in a defined, selective manner. For example, in the case in which the overall priority factor is high, the data may be transmitted immediately to the server device, whereas in the case in which the overall priority factor is low, the data may be transmitted to the server device with a defined time delay. In this manner, the "level of knowledge" that the motor vehicle or the overall system already has may be advantageously taken into account. As a result, this may allow a quantity of data to be transmitted on a communications connection between the motor vehicle and the server device in an optimum manner.

One further advantageous refinement of the method provides that the locational reference of the surrounding-area data include a geometric description or a topological description. In this manner, different ways for generating a locational reference of the surrounding-area data may be advantageously implemented.

Below, the present invention is described in detail with further features and advantages, with the aid of two figures. In this context, all features described or represented form, individually or in any combination, the subject matter of the present invention, regardless of their combination in the description herein, as well as independently of their wording and representation in the description and in the figures, respectively. Above all, the figures are meant to clarify the main features of the present invention.

DETAILED DESCRIPTION OF EXAMPLE EMBODIMENTS

Figure 1:
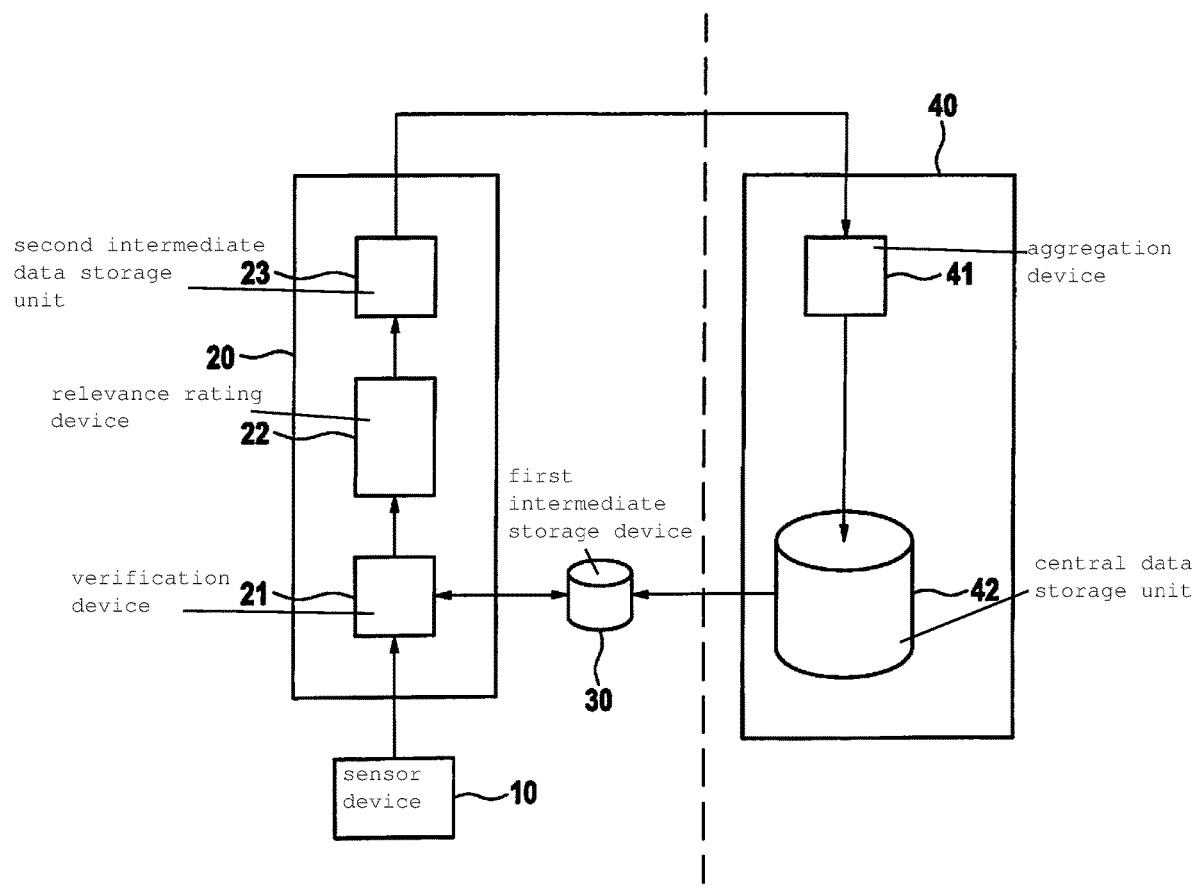
FIG. 1 shows a schematic representation of a specific embodiment of the device according to the present invention.

The term, data aggregation, comes originally from the area of cloud computing or data mining, where a large amount of data is processed and stored in a suitable manner. One possible problem of using collective aggregation of reference data for highly accurate localization is the transmission of corresponding data between the client and the server in as close to real time as possible, since data volumes necessary for localizing automated motor vehicles are typically very large, for example, in the range of approximately 500 MB/km.

In the case of automated or autonomous driving, the motor vehicle should sense the environment essentially free of human assistance and exclusively with the aid of sensors, and bring the driver reliably and accident-free to his or her destination. To that end, various sensors are used for monitoring the surroundings of the motor vehicle, and current reference data is used for self-localization. In this example, the latter includes the data to be aggregated.

Since an upload link of a mobile radio communication system typically has a narrower bandwidth than a corresponding download link, a strategy of a data upload for central aggregation of current information is provided, which allows an available communications bandwidth to be utilized as effectively as possible.

Conventional upload strategies that have been used up to now in collective data aggregation may be described using the following developments:

A) All of the data necessary for aggregation on the server is typically transmitted to a server immediately after its acquisition on the client. This is virtually real-time transmission of the data, it being possible to bundle currently acquired data.

B) All of the data acquired on the client is gathered on the client and is transmitted together in a large bundle to a server, with a relatively large time delay with regard to its acquisition (for example, upon arrival at the destination, when a WLAN radio communications network is available).

Development A) has the disadvantage that it is only suitable for applications, in which a transmission rate regarding the data to be transmitted by the client to the server is considerably less than an available communications bandwidth.

Development B) has the disadvantage that acquired data is only available for aggregation on the server with a considerable time delay. Therefore, the aggregated data is less current than in the case of development A).

In accordance with an example embodiment of the present invention, the upload strategy includes a specific combination of developments A) and B). In this manner, acquired data is preferentially ascertained on a server in accordance with development A), when it has a high information content and/or when it is of considerable relevance (that is, the application requires, for example, a highly accurate and up-to-date aggregation of respectively specific information). Otherwise, acquired data is preferably transmitted to the server in accordance with development B). Such a combination of the two developments may allow aggregated data to be more up-to-date than in the case of development B), a lower average data transmission rate being advantageously necessary for the virtual real-time transmission than in the case of development A).

As a result, the upload strategy described below supports a high degree of currentness of aggregated data with simultaneously reduced requirements regarding the necessary data transmission rate.

FIG. 1 shows, in a schematic manner, a specific embodiment of a device 20 for uploading data. Using a data service, device 20 downloads, for itself, from a central data storage unit 42 of a server device 40, the current version of aggregated data for the current surrounding area of the device 20, since all of the data has a locational reference, and stores the data in a local, first intermediate data storage unit 30. Central data storage unit 42 contains the data aggregated by aggregation device 41. In this example, aggregation device 41 is part of server device 40, but all or part of it may also be connected upstream of the latter. Device 20 may be situated, for example, on an automated or autonomous motor vehicle (not shown).

A sensor device 10 of the motor vehicle is able to acquire current data or data objects in the environment. Sensor device 10 preferably takes the form of a video sensor, a radar sensor, etc., of the motor vehicle. Acquisition of data in the surrounding area of the motor vehicle is rendered possible by sensor device 10. Using sensor device 10, a locational reference of the acquired surrounding-area data may also be generated, for example, in the form of a WGS84 coordinate (World Geodetic System 1984) with the aid of a GPS sensor (Global Positioning System), or in the form of a topological description of the acquired data object. In this manner, the acquired surrounding-area data is assigned specifically to spatial positions.

Sensor device 10 acquires, in particular, image data in the form of point clouds, linear features, etc. The above-mentioned data may also include semantic features, such as trees, street illumination devices, buildings, etc.

How and/or when the acquired surrounding-area data is transmitted for aggregation on an aggregation device 41 is ascertained with the aid of device 20. Using aggregation device 41, localization reference data and/or landmark data, which is stored in central data storage unit 42 and is available to motor vehicles for the purpose of self-localization of the vehicle, is aggregated from collectively acquired, locationally-based surrounding-area data, which means that improved localization of the motor vehicle in question is supported. For this purpose, device 20 takes the form of a prioritizing device and implements a multistage prioritizing operation. It includes a verification device 21, a relevance rating device 22 and a second intermediate data storage unit 23 as components. In an alternative not shown, it is also conceivable to position the above-described components separately from one another in the motor vehicle.

Regarding the uploading prioritization of the surrounding-area data, the data acquired by sensor device 10 is initially compared by verification device 21 to corresponding data from first intermediate data storage unit 30. In this context, the data in first intermediate data storage unit 30 constitutes a subset of known data of central data storage unit 42 of server device 40. In a first step, a similarity of the acquired surrounding-area data to the known surrounding-area data is checked, a quantified currentness value N being related to a first priority factor P1 according to the following equation:

$$P1 = f(N) \qquad (1)$$

In this manner, each acquired data object is assigned a first priority factor P1, where:

P1 is large when currentness N is large, and
P1 is small when currentness N is small.

In the next step, for each acquired data object, a degree of relevance R with regard to the type of data object is checked by relevance rating device R; each data object being assigned a degree of relevance R as a function of data type t, the degree of relevance being related to a second priority factor P2 according to the following equation:

$$P2=f(R) \quad (2)$$

In this manner, each acquired data object is assigned a second priority factor P2, where:
P2 is large when degree of relevance R of data object type t is high, and
P2 is small when degree of relevance R of data object type t is low.

After the priority factors P1 and P2 associated with an acquired data object are ascertained in this manner, an overall priority factor PG is determined from the two priority factors P1, P2 for the data object in question, for example, according to the following equation:

$$PG=P1+P2 \quad (3)$$

Other mathematical relationships between priority factors P1, P2 are also conceivable; priority factors P1, P2 also being able to be weighted.

Having overall priority factor PG attributed to them, data objects are transmitted to second intermediate data storage unit 23 of device 20. In second intermediate data storage unit 23, on the basis of overall priority factor PG of a data object, it is decided when and how a data object is uploaded to server device 40, where the data object is subsequently processed further with the aid of aggregation device 41, and the aggregation result is then stored in central data storage unit 42. If overall priority factor PG reaches or exceeds, for example, a predefined threshold value SW known system-wide, then the immediate transmission of the corresponding data object to server device 40 is initiated; the transmission being carried out via mobile radio communication, depending on the available wireless technology, when available, preferably via WLAN. Above-mentioned threshold value SW is preferably known to server device 40 as well and may be transmitted, for example, by it to device 20.

However, if overall priority factor PG<SW, the corresponding data object is not transmitted immediately, but initially stored temporarily in second intermediate data storage unit 23. In this context, the temporary storage takes place until a sufficiently large, free, and therefore cost-effective communications bandwidth is available (for example, by availability of WLAN) for transmitting or uploading the data objects to server device 40 at a later time, for example, in the order of their overall priority factors PG (large priority factor PG first, small priority factor PG after that).

Preferably, device 20 is technically implemented as software of an electronic control unit (not shown) of the motor vehicle, through which simple implementation and modification of performance characteristics of device 20 is supported. As an alternative, device 20 may also be implemented as hardware, for example, as an ASIC (application-specific integrated circuit) or FPGA (field programmable gate array).

In a variant not shown, it may also be provided that server device 40 be situated inside the motor vehicle. In this case, a volume of data to be transmitted to the internal motor vehicle database may be advantageously optimized, thereby allowing the database to be configured more efficiently.

Figure 2:
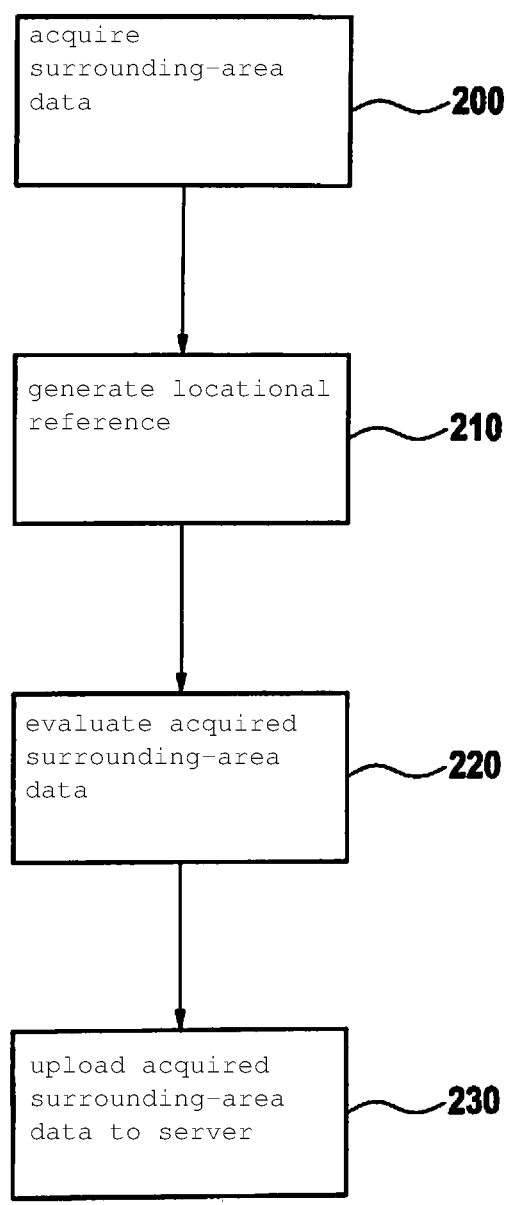
FIG. 2 shows a schematic flow chart of a specific embodiment of the method according to the present invention.

FIG. 2 shows a basic sequence of the method:

In a step 200, surrounding-area data of the motor vehicle is acquired by a sensor device 10.

In a step 210, a locational reference for the acquired surrounding-area data is generated.

In a step 220, the acquired surrounding-area data is evaluated by comparing the acquired surrounding-area data to known surrounding-area data of a data storage unit 42 of a server device 40.

Finally, in a step 230, the acquired surrounding-area data is uploaded to server device 40 as a function of the evaluation.

In summary, the present invention provides a method and a device, by which it is possible to upload data of a motor vehicle to a server device on the basis of a previous evaluation of data objects. In this manner, an available communications bandwidth may be used efficiently, which means that an overall system may thereby link as many road users as possible in an efficient manner.

In addition, this may advantageously allow that only data, which is actually necessary, e.g. for the purpose of localization, be transmitted to the server.

One skilled in the art will modify the features of the present invention described herein in a suitable manner and/or combine them with one another without departing from the scope of the present invention.

What is claimed is:

1. A method for uploading data of a motor vehicle, comprising:
   acquiring surrounding-area data of the motor vehicle with a sensor device;
   generating coordinate information for the acquired surrounding-area data;
   evaluating the acquired surrounding-area data by comparing the acquired surrounding-area data to known surrounding-area data of a data storage unit of a server device; and
   uploading the acquired surrounding-area data to the server device as a function of the evaluation;
   wherein there are a plurality of data objects in the acquired surrounding-area data,
   wherein a corresponding overall priority factor is ascertained for each of the plurality of data objects,
   wherein if the overall priority factor reaches or exceeds a threshold value, then a corresponding one of the data objects associated with the corresponding overall priority factor is transmitted immediately to the server device, and wherein if the overall priority factor is less than the threshold value, the corresponding one of the data objects is not transmitted immediately and is initially stored temporarily in an intermediate data storage unit until a communications bandwidth is available for transmitting or uploading each of the data objects to the server device at a later time, in an order of each of the corresponding overall priority factors of each of the data objects,
   wherein the acquired surrounding-area data is uploaded to the server device as a function of the overall priority factor,
   wherein a similarity of the acquired surrounding-area data to the known surrounding-area data is checked, a quantified currentness value being related to a first priority factor, so that each of the data objects is assigned a corresponding first priority factor,
   wherein for each of the data objects, a degree of relevance with regard to a type of each of the data objects is checked by a relevance rating device, and each of the data objects is assigned the degree of relevance as a function of a corresponding data type, the degree of relevance being related to a second priority factor, so that each of the data objects is assigned a corresponding second priority factor, and wherein after the first and second priority factors are associated with the corresponding data object, the overall priority factor is ascertained from the first and second priority factors for the corresponding data object.

2. The method as recited in claim 1, wherein a higher degree of currentness of the corresponding one of the data objects corresponds to a higher corresponding first priority factor.

3. The method as recited in claim 2, wherein a higher relevance of the corresponding one of the data objects corresponds to a higher degree of relevance.

4. The method as recited in claim 3, wherein the higher degree of relevance of the corresponding one of the data objects corresponds to a higher corresponding second priority factor.

5. The method as recited in claim 1, wherein the coordinate information of the surrounding-area data includes a geometric description or a topological description.

6. An apparatus for uploading data of a motor vehicle, comprising: a device configured to perform the following:
   acquiring surrounding-area data of the motor vehicle with a sensor device;
   generating coordinate information for the acquired surrounding-area data;
   evaluating the acquired surrounding-area data by comparing the acquired surrounding-area data to known surrounding-area data of a data storage unit of a server device; and
   uploading the acquired surrounding-area data to the server device as a function of the evaluation;
   wherein there are a plurality of data objects in the acquired surrounding-area data,
   wherein a corresponding overall priority factor is ascertained for each of the plurality of data objects,
   wherein if the overall priority factor reaches or exceeds a threshold value, then a corresponding one of the data objects associated with the corresponding overall priority factor is transmitted immediately to the server device, and wherein if the overall priority factor is less than the threshold value, the corresponding one of the data objects is not transmitted immediately and is initially stored temporarily in an intermediate data storage unit until a communications bandwidth is available for transmitting or uploading each of the data objects to the server device at a later time, in an order of each of the corresponding overall priority factors of each of the data objects, and
   wherein the acquired surrounding-area data is uploaded to the server device as a function of the overall priority factor with respect to the threshold value,
   wherein a similarity of the acquired surrounding-area data to the known surrounding-area data is checked, a quantified currentness value being related to a first priority factor, so that each of the data objects is assigned a corresponding first priority factor,
   wherein for each of the data objects, a degree of relevance with regard to a type of each of the data objects is checked by a relevance rating device, and each of the data objects is assigned the degree of relevance as a function of a corresponding data type, the degree of relevance being related to a second priority factor, so that each of the data objects is assigned a corresponding second priority factor, and
   wherein after the first and second priority factors are associated with the corresponding data object, the overall priority factor is ascertained from the first and second priority factors for the corresponding data object.

7. The apparatus as recited in claim 6, wherein the acquired surrounding-area data is compared to data, which represents a subset of data of the server device.

8. A non-transitory computer-readable storage medium on which is stored a computer program, which is executable by a processor, comprising:
   a program code arrangement including program code for uploading data of a motor vehicle, by performing the following:
      acquiring surrounding-area data of the motor vehicle with a sensor device;
      generating coordinate information for the acquired surrounding-area data;
      evaluating the acquired surrounding-area data by comparing the acquired surrounding-area data to known surrounding-area data of a data storage unit of a server device; and
      uploading the acquired surrounding-area data to the server device as a function of the evaluation;
      wherein there are a plurality of data objects in the acquired surrounding-area data,
      wherein a corresponding overall priority factor is ascertained for each of the plurality of data objects, and
   wherein if the overall priority factor reaches or exceeds a threshold value, then a corresponding one of the data objects associated with the corresponding overall priority factor is transmitted immediately to the server device, and wherein if the overall priority factor is less than the threshold value, the corresponding one of the data objects is not transmitted immediately and is initially stored temporarily in an intermediate data storage unit until a communications bandwidth is available for transmitting or uploading each of the data objects to the server device at a later time, in an order of each of the corresponding overall priority factors of each of the data objects,
   wherein the acquired surrounding-area data is uploaded to the server device as a function of the overall priority factor,
   wherein a similarity of the acquired surrounding-area data to the known surrounding-area data is checked, a quantified currentness value being related to a first priority factor, so that each of the data objects is assigned a corresponding first priority factor,
   wherein for each of the data objects, a degree of relevance with regard to a type of each of the data objects is checked by a relevance rating device, and each of the data objects is assigned the degree of relevance as a function of a corresponding data type, the degree of relevance being related to a second priority factor, so that each of the data objects is assigned a corresponding second priority factor, and
   wherein after the first and second priority factors are associated with the corresponding data object, the overall priority factor is ascertained from the first and second priority factors for the corresponding data object.

* * * * *